(12) United States Patent
Truscott

(10) Patent No.: US 10,613,507 B2
(45) Date of Patent: *Apr. 7, 2020

(54) AUTOMATED LOADING BRIDGE POSITIONING USING ENCODED DECALS

(71) Applicant: Accenture Global Solutions Limited, Dublin (IE)

(72) Inventor: Andrew J. Truscott, Spring, TX (US)

(73) Assignee: Accenture Global Solutions Limited, Dublin (IE)

( * ) Notice: Subject to any disclaimer, the term of this patent is extended or adjusted under 35 U.S.C. 154(b) by 294 days.

This patent is subject to a terminal disclaimer.

(21) Appl. No.: 15/686,408

(22) Filed: Aug. 25, 2017

(65) Prior Publication Data

US 2018/0074473 A1 Mar. 15, 2018

Related U.S. Application Data

(63) Continuation of application No. 15/260,887, filed on Sep. 9, 2016, now Pat. No. 9,746,846.

(51) Int. Cl.
| | | |
|---|---|---|
| *G05B 19/12* | (2006.01) | |
| *B64F 1/305* | (2006.01) | |
| *G05B 19/29* | (2006.01) | |
| *G05B 19/042* | (2006.01) | |
| *G06K 17/00* | (2006.01) | |

(52) U.S. Cl.
CPC ............ *G05B 19/124* (2013.01); *B64F 1/305* (2013.01); *G05B 19/042* (2013.01); *G05B 19/29* (2013.01); *G05B 2219/40538* (2013.01)

(58) Field of Classification Search
CPC .... G05B 19/124; G05B 19/042; G05B 19/29; G05B 2219/40538; B64F 1/305

USPC ........................................................ 700/275
See application file for complete search history.

(56) References Cited

U.S. PATENT DOCUMENTS

| | | |
|---|---|---|
| 3,538,529 A | 11/1970 | Breier et al. |
| 3,683,440 A | 8/1972 | Xenakis et al. |
| 3,703,737 A | 11/1972 | Eggert, Jr. et al. |

(Continued)

FOREIGN PATENT DOCUMENTS

| | | |
|---|---|---|
| DE | 10 2011 101418 | 11/2012 |
| WO | WO2004/0074098 | 9/2004 |

(Continued)

OTHER PUBLICATIONS

Extended European Search Report corresponding to EP 17 18 9207, dated Jan. 24, 2018, 8 pages.

(Continued)

*Primary Examiner* — Jigneshkumar C Patel
(74) *Attorney, Agent, or Firm* — Harrity & Harrity, LLP

(57) ABSTRACT

A device may obtain, from one or more cameras, an image that depicts one or more encoded decals positioned on a body of a vehicle. The device may process the image and may identify, based on processing the image, one or more characteristics of the one or more encoded decals. The device may determine, based on the one or more characteristics of the one or more encoded decals, positioning information to be used to position a loading bridge relative to the body of the vehicle. The device may determine one or more control signals based on the positioning information. The device may provide the one or more control signals to one or more actuators to automatically position the loading bridge relative to the body of the vehicle.

20 Claims, 11 Drawing Sheets

(56) References Cited

U.S. PATENT DOCUMENTS

| | | |
|---|---|---|
| 3,724,015 A | 4/1973 | Japes et al. |
| 3,747,147 A | 7/1973 | Weese et al. |
| 3,893,576 A | 7/1975 | Casady et al. |
| 4,357,860 A | 11/1982 | Krzak et al. |
| 4,852,197 A | 8/1989 | Thomas, Jr. |
| 5,004,188 A | 4/1991 | Donneky et al. |
| 5,105,495 A | 4/1992 | Larson et al. |
| 5,226,204 A | 7/1993 | Schoenberger et al. |
| 5,257,431 A | 11/1993 | Larson et al. |
| 5,267,368 A | 12/1993 | Saunders |
| 5,524,318 A | 6/1996 | Thomas |
| 5,761,757 A | 6/1998 | Mitchell et al. |
| 5,791,003 A | 8/1998 | Streeter et al. |
| 6,122,789 A | 9/2000 | Stephenson et al. |
| 6,330,726 B1 | 12/2001 | Hone et al. |
| 6,487,743 B1 | 12/2002 | Nicoletti |
| 6,543,076 B1 | 4/2003 | Worpenberg et al. |
| 6,745,423 B1 | 6/2004 | Hutton |
| 6,993,802 B1 | 2/2006 | Hone |
| 7,168,119 B1 | 1/2007 | Telford et al. |
| 7,458,122 B2 | 12/2008 | Hutton |
| 8,806,690 B1 | 8/2014 | Keith et al. |
| 8,879,822 B2 | 11/2014 | Matsumoto |
| 9,066,737 B2 | 6/2015 | Barwinkel et al. |
| 9,067,692 B2 | 6/2015 | Karasek |
| 9,746,846 B1 | 8/2017 | Truscott |
| 2002/0017002 A1 | 2/2002 | Sloan et al. |
| 2002/0100128 A1 | 8/2002 | Tholen et al. |
| 2003/0074749 A1 | 4/2003 | Smith |
| 2003/0136898 A1 | 7/2003 | Oki et al. |
| 2003/0145404 A1 | 8/2003 | Hutton |
| 2003/0189134 A1 | 10/2003 | Konya |
| 2003/0189135 A1 | 10/2003 | Konya |
| 2003/0208861 A1 | 11/2003 | Hutton et al. |
| 2003/0229955 A1 | 12/2003 | Savage |
| 2004/0088805 A1 | 5/2004 | Hansen et al. |
| 2004/0172776 A1 | 9/2004 | Hutton |
| 2004/0187234 A1 | 9/2004 | Hutton et al. |
| 2004/0211014 A1 | 10/2004 | Larson |
| 2005/0158157 A1 | 7/2005 | Hutton |
| 2005/0198750 A1 | 9/2005 | Spencer |
| 2006/0174429 A1 | 8/2006 | Koch et al. |
| 2006/0277699 A1 | 12/2006 | Hutton |
| 2006/0287780 A1 | 12/2006 | Hutton |
| 2006/0288502 A1 | 12/2006 | Hutton |
| 2006/0288503 A1 | 12/2006 | Hutton |
| 2007/0101520 A1 | 5/2007 | Hutton |
| 2007/0119003 A1 | 5/2007 | Hutton |
| 2007/0214584 A1 | 9/2007 | Hutton |
| 2007/0214585 A1 | 9/2007 | Hutton et al. |
| 2007/0289074 A1 | 12/2007 | Muller et al. |
| 2008/0060145 A1 | 3/2008 | Hutton |
| 2008/0065271 A1 | 3/2008 | Hutton |
| 2008/0098537 A1 | 5/2008 | Hutton |
| 2008/0098538 A1 | 5/2008 | Hutton |
| 2008/0098539 A1 | 5/2008 | Hutton |
| 2008/0109970 A1 | 5/2008 | Hutton |
| 2009/0205145 A1 | 8/2009 | Okahira et al. |
| 2010/0257790 A1 | 10/2010 | Kim et al. |
| 2013/0247310 A1 | 9/2013 | Bonvila |
| 2015/0274324 A1 | 10/2015 | Xiang et al. |
| 2016/0052645 A1 | 2/2016 | Kim et al. |
| 2017/0330345 A1 | 11/2017 | Nornes |
| 2018/0141681 A1 | 5/2018 | Schuster et al. |
| 2018/0371712 A1 | 12/2018 | Glatfelter et al. |
| 2019/0009927 A1 | 1/2019 | Obinna |

FOREIGN PATENT DOCUMENTS

| | | |
|---|---|---|
| WO | WO 2016/099285 | 6/2016 |
| WO | WO 2017/137241 | 8/2017 |
| WO | WO 2017/198605 | 11/2017 |

OTHER PUBLICATIONS

Aero News Network, "Passenger Bridge on Auto, Mr. Sulu", http://www.aero-news.net/index.cfm?do=main.textpost&id=ce1db870-5cb7-4606-b6bc-c9681b10d2f6, Aug. 27, 2004, 3 pages.

Sick Sensor Intelligence, "Passenger boarding bridge and aircraft docking system", http://www.sick.com/gb/en/industires/airport/aircraft-handling-at-the-terminal/passenger-boarding-bridge-and-aircraft-docking-system/c/g357295, Feb. 1, 2015, 2 pages.

Wikipedia, "Jet Bridge", https://en.wikipedia.org/wiki/Jet_bridge, Jul. 30, 2016, 7 pages.

US 10,613,507 B2

AUTOMATED LOADING BRIDGE POSITIONING USING ENCODED DECALS

RELATED APPLICATION

This application is a continuation of U.S. patent application Ser. No. 15/260,887, filed Sep. 9, 2016 (now U.S. Pat. No. 9,746,846), which is incorporated herein by reference.

BACKGROUND

A loading bridge is a movable connector that extends from a loading gate to a door on a vehicle. The loading bridge allows passengers or other objects (e.g., cargo) to be boarded or removed from the vehicle. For example, a jet bridge is an example of a loading bridge used to convey passengers from an airport terminal gate to an aircraft, and a gangway is an example of a loading bridge used to convey passengers from a dockside terminal to a cruise ship. The loading bridge may permit loading and unloading without having to go outdoors and without having to ascend or descend stairs to enter or exit the vehicle.

SUMMARY

According to some possible implementations, a device may obtain, from one or more cameras, an image that depicts one or more encoded decals positioned on a body of a vehicle. The device may process the image and may identify, based on processing the image, one or more characteristics of the one or more encoded decals. The device may determine, based on the one or more characteristics of the one or more encoded decals, positioning information to be used to position a loading bridge relative to the body of the vehicle. The device may determine one or more control signals based on the positioning information. The device may provide the one or more control signals to one or more actuators to automatically position the loading bridge relative to the body of the vehicle.

According to some possible implementations, a method may include receiving, by a device, one or more images that depict one or more encoded decals positioned on a surface. The method may include processing, by the device, the one or more images. The method may include identifying, by the device and based on processing the one or more images, one or more characteristics of the one or more encoded decals. The method may include determining, by the device and based on the one or more characteristics of the one or more encoded decals, positioning information to be used to position a movable object relative to the surface. The method may include determining, by the device, one or more control signals based on the positioning information. The method may include providing, by the device, the one or more control signals to one or more actuators to automatically position the movable object relative to the surface.

According to some possible implementations, a non-transitory computer-readable medium may store one or more instructions that, when executed by one or more processors, cause the one or more processors to identify one or more encoded decals included in an image. The one or more encoded decals may be positioned on a surface. The one or more instructions may cause the one or more processors to identify one or more characteristics of the one or more encoded decals. The one or more instructions may cause the one or more processors to determine, based on the one or more characteristics of the one or more encoded decals, positioning information to be used to position a movable object relative to the surface. The one or more instructions may cause the one or more processors to determine one or more control signals, to be provided to one or more actuators, based on the positioning information. The one or more instructions may cause the one or more processors to provide the one or more control signals to the one or more actuators to position the movable object relative to the surface.

DETAILED DESCRIPTION

The following detailed description of example implementations refers to the accompanying drawings. The same reference numbers in different drawings may identify the same or similar elements.

A loading bridge (e.g., a jet bridge) is a movable object that extends to connect to a vehicle, such as an aircraft (e.g., an airplane), a ship, a boat, or another vehicle, so as to allow passengers or objects to enter or exit the vehicle, such as via a door or other entryway on the vehicle. The loading bridge may provide such passengers or objects with access to or from the vehicle that is safe, secure, and protected from outdoor elements.

Different vehicles may have doors in different locations, at different heights, at different positions, of different dimensions, or the like. Furthermore, different vehicles may have bodies of different shapes or curvatures. For these reasons, it may be difficult to consistently position or align a loading bridge with a door of a vehicle, potentially causing damage to the vehicle, causing damage to the loading bridge, and/or introducing delay in loading or unloading the vehicle.

Implementations described herein provide a way to automatically align a loading bridge with a door of a vehicle. A processing device obtains images, captured by a camera, of encoded decals on the vehicle. The processing device analyzes the images to determine characteristics of the encoded decals and determines positioning information based upon those characteristics. Based on the positioning information, the processing device provides control signals to move the loading bridge and align the loading bridge with the vehicle. In this way, the possibility and/or frequency of alignment errors is reduced, thereby reducing the risk of damage to the loading bridge or to the vehicle, reducing risk of injury to passengers and air carrier employees, and/or reducing delays associated with loading or unloading the vehicle.

Figure 1A:
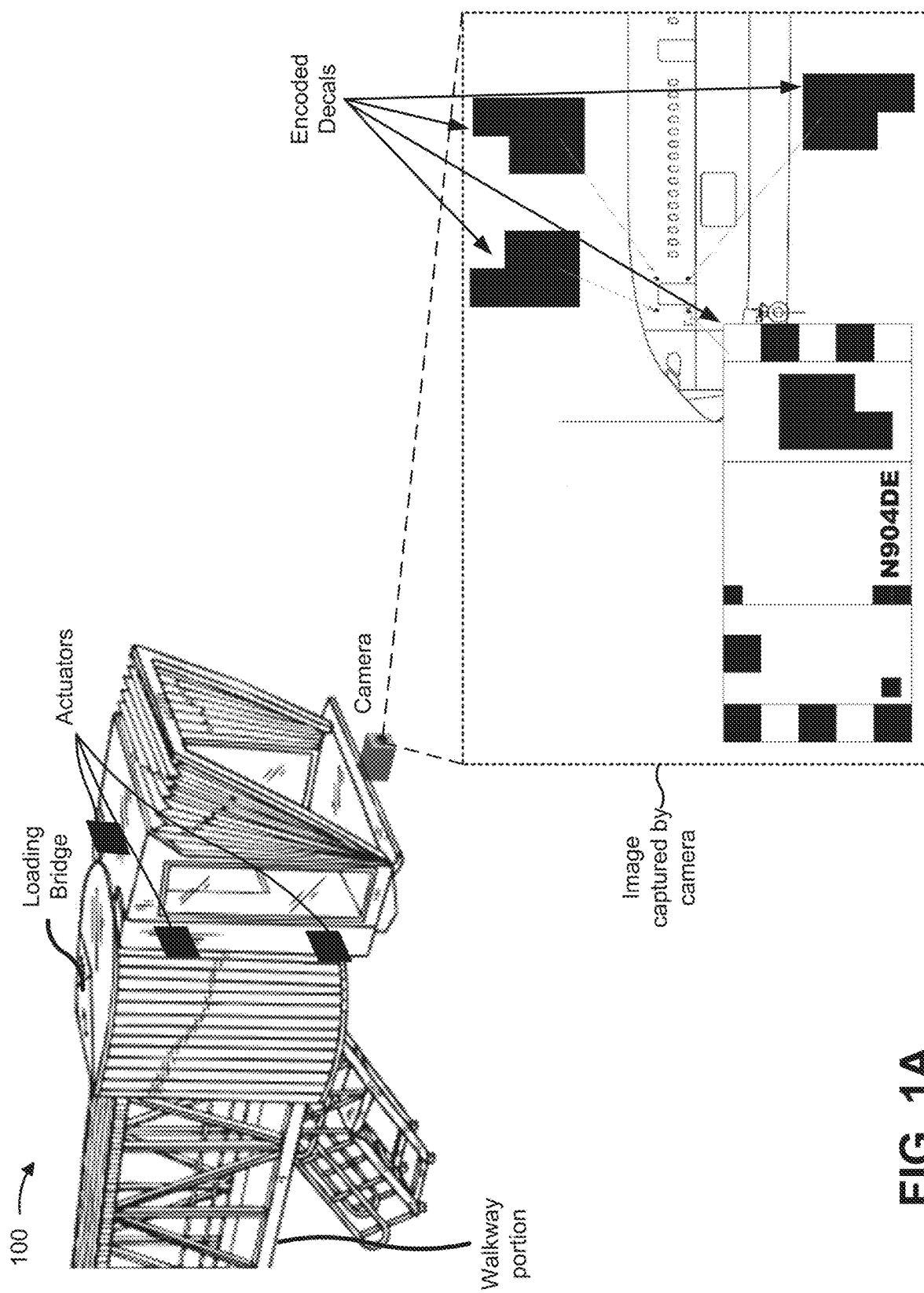
FIGS. 1A and 1B are diagrams of an overview of an example implementation described herein.
Figure 1B:
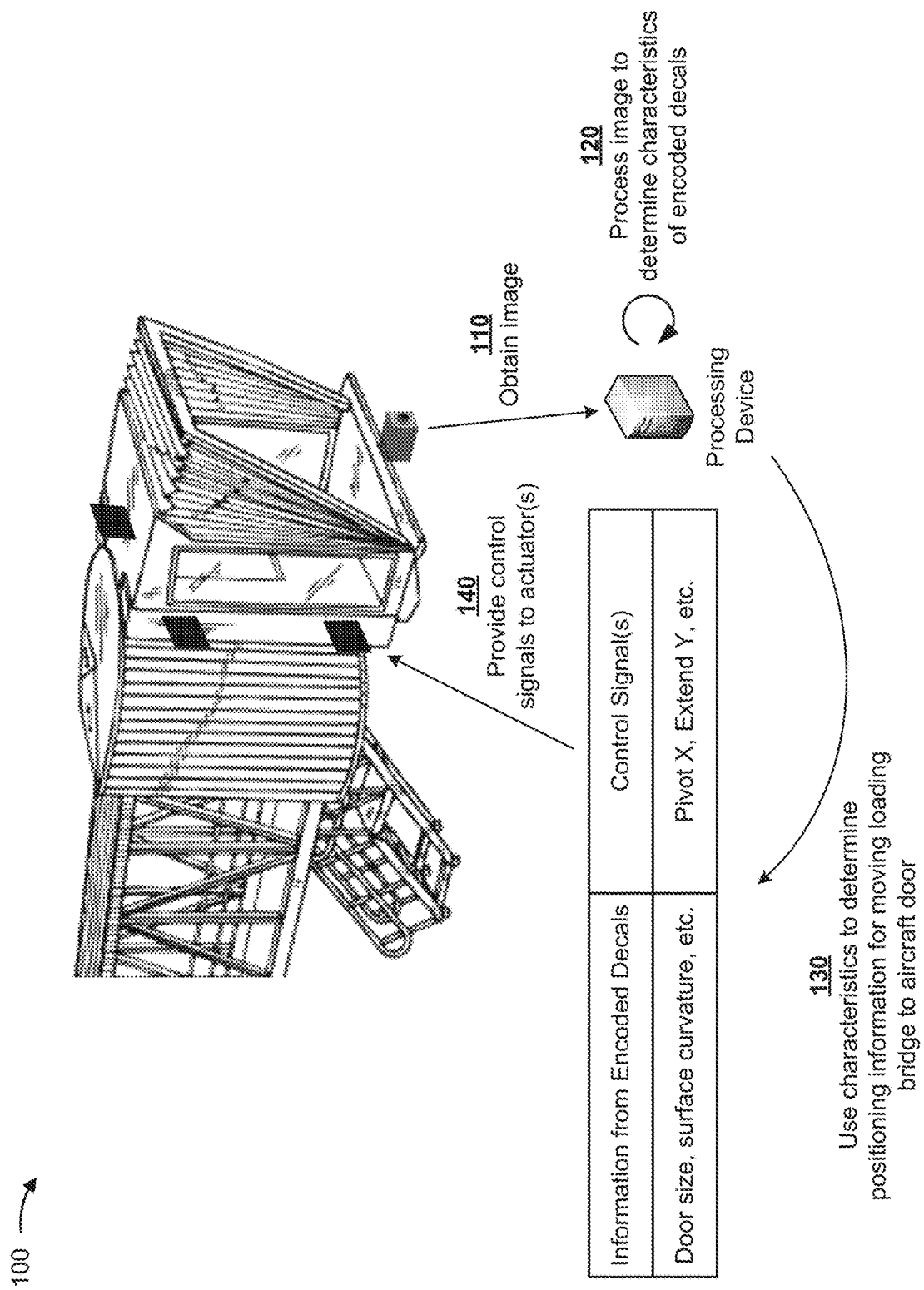

FIGS. 1A and 1B are diagrams of an overview of an example implementation 100 described herein. As shown in FIG. 1A, example implementation 100 may include a loading bridge that includes one or more actuators (e.g., servo controlled motors), for moving the loading bridge, and a camera (or cameras) that may capture an image that includes encoded decals on a vehicle, such as an airplane. Additional actuators (not shown) may also be used to position and/or support a walkway portion associated with the loading bridge. As shown in FIG. 1B, and by reference number 110, a processing device may obtain a series of images from the camera that depicts one or more encoded decals positioned on a surface. For example, the processing device may obtain an image such as the image shown in FIG. 1A, which depicts encoded decals positioned at the corners of a door on an aircraft.

As shown by reference number 120, the processing device may process the image to determine one or more characteristics (e.g., a shape, a size, a color, a position, etc.) of the one or more encoded decals. As shown by reference number 130, the processing device may use the characteristics to determine positioning information for moving the loading bridge to the aircraft door. For example, the processing device may determine decal information (e.g., door size, surface curvature, etc.) based on the characteristics of the encoded decals, and may determine, based on the decal information, positioning information indicating control signals (e.g., pivot X, extend Y, etc.) to move the loading bridge to the aircraft door. The encoded decals may contain discrete information which can be relied upon by the processing device, or reference information which can be verified by the processing device, as described elsewhere herein.

As shown by reference number 140, the processing device may provide one or more control signals, as indicated by the positioning information, to the actuators in order to automatically position the loading bridge relative to the vehicle. In this way, the possibility and/or frequency of alignment errors is reduced, thereby reducing the risk of damage to the loading bridge or to the vehicle, and/or reducing delays associated with loading or unloading the vehicle.

As indicated above, FIGS. 1A and 1B are provided merely as an example. Other examples are possible and may differ from what was described in connection with FIGS. 1A and 1B.

Figure 2:
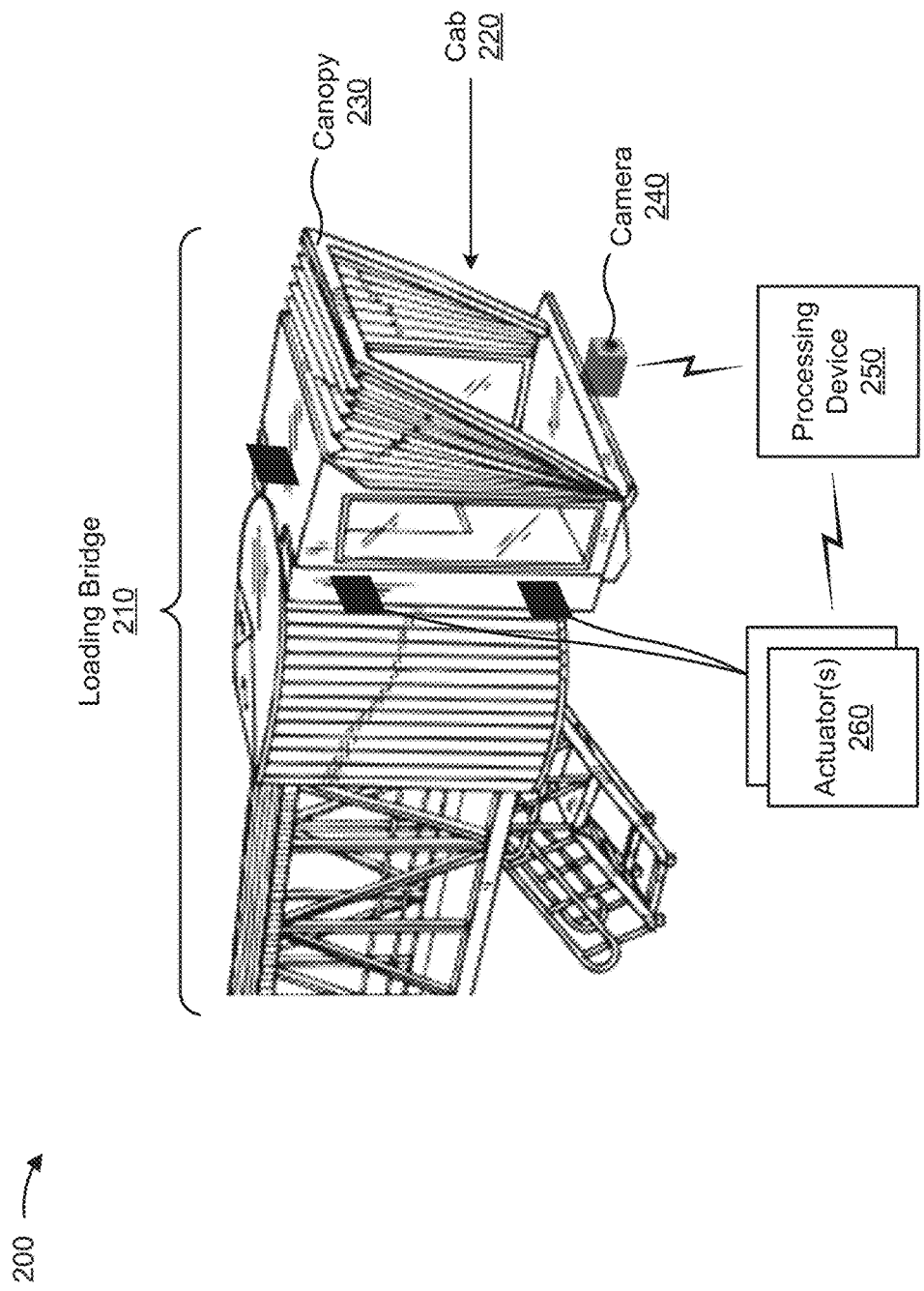
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a loading bridge 210, a cab 220, a canopy 230, a camera 240, a processing device 250, and one or more actuators 260. Devices of environment 200 may interconnect via wired connections, wireless connections, or a combination of wired and wireless connections.

Loading bridge 210 includes one or more devices capable of connecting to a vehicle. For example, loading bridge 210 may include a movable object that connects to an airplane, a boat, a truck, or another type of vehicle. In some implementations, loading bridge 210 may provide for loading or unloading of passengers (e.g., humans, animals, etc.) or objects (e.g., luggage, cargo, smaller vehicles, etc.). While some implementations may be described herein in the context of a loading bridge that connects to a surface of a vehicle, some implementations may apply to other types of movable objects, which may be designed to connect to any surface.

Cab 220 includes a portion of loading bridge 210, such as a portion at the end of loading bridge 210 that connects to a vehicle. For example, cab 220 may be provided at the end of loading bridge 210 and may be raised or lowered, may be extended or retracted, and/or may pivot, to accommodate vehicles of different heights, sizes, or the like. Cab 220 may include an operator's station from which an operator may control the motion of cab 220.

Canopy 230 includes a portion of loading bridge 210 that may extend to the vehicle. For example, canopy 230 may include an accordion-like canopy that allows the bridge to dock with vehicles of differing shapes and sizes, and may provide a nearly weather-proof seal.

Camera 240 includes one or more devices capable of capturing images, such as one or more still images or a sequence of images that form a video. For example, camera 240 may include a still camera (e.g., a digital camera), a video camera (e.g., a digital video camera), or the like. In some implementations, camera 240 may be movable and/or may include a movable lens, and camera 240 and/or the lens may move (e.g., orient, zoom, or focus) automatically based on internal functionality (e.g., for identification, tracking, etc.) and/or instructions from another device (e.g., processing device 250). Camera 240 can be configured for day or night operations using, for example, infrared image capture components. Camera 240 may also include distance and/or motion sensing components, such as laser range finders, passive infrared motion detectors, etc. In some implementations, camera 240 may include multiple cameras, which may communicate directly with processing device 250 or indirectly with processing device 250 (e.g., via an imaging aggregator).

In some implementations, camera 240 may be incorporated into processing device 250 (e.g., via built-in hardware). In some implementations, camera 240 may be separate from processing device 250, and may communicate with processing device 250 to provide images and/or other information to processing device 250 and/or to obtain instructions and/or other information from processing device 250. In this case, camera 240 may communicate with processing device 250 via a wired connection (e.g., a universal serial bus (USB) connection, an Ethernet connection, etc.) and/or a wireless connection (e.g., a Wi-Fi connection, a near field communication (NFC) connection, etc.).

Processing device 250 includes one or more devices capable of processing images. For example, processing device 250 may include a computing device, such as a desktop computer, a laptop computer, a server, or the like. In some implementations, processing device 250 may process one or more images captured by camera 240. Based on processing the images, processing device 250 may provide one or more control signals to one or more actuators 260 to position loading bridge 210 (e.g., cab 220 of loading bridge 210) relative to a vehicle. In some implementations, processing device 250 may provide information to camera 240 indicating adjustments to orientation, zoom, focus, or the like, to capture additional images, to improve clarity of images, or the like.

Actuator 260 includes one or more devices capable of moving or controlling loading bridge 210. For example, actuator 260 may include a hydraulic actuator, a pneumatic actuator, an electric actuator, a servomechanism, or the like. In some implementations, actuator 260 may receive one or more control signals from processing device 250, and may perform a mechanical action based on the control signal(s). For example, actuator 260 may perform a mechanical action to raise, lower, extend, retract, or pivot loading bridge 210.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
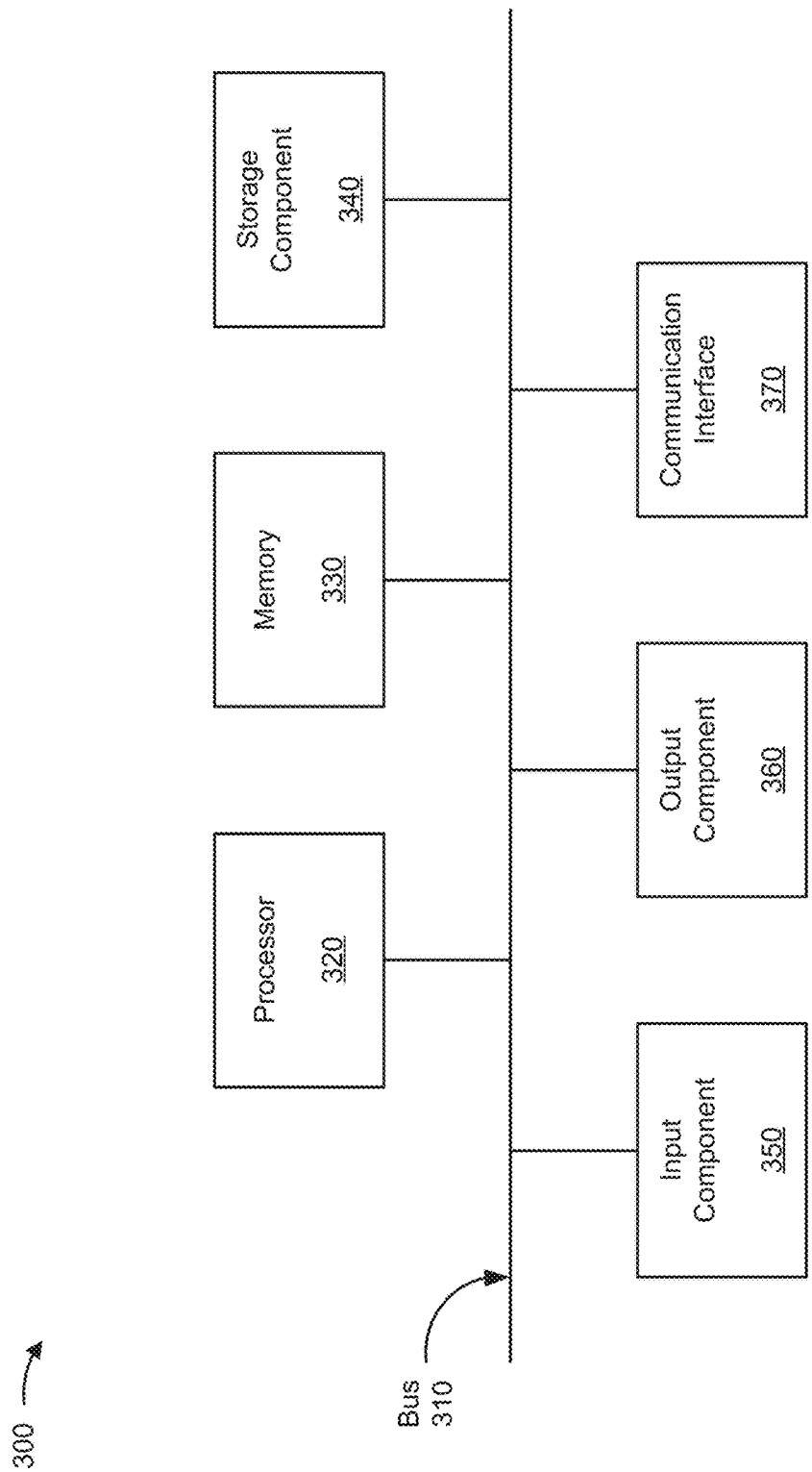
FIG. 3 is a diagram of example components of one or more devices of FIG. 2.

FIG. 3 is a diagram of example components of a device 300. Device 300 may correspond to camera 240, processing device 250, and/or actuator 260. In some implementations, camera 240, processing device 250, and/or actuator 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
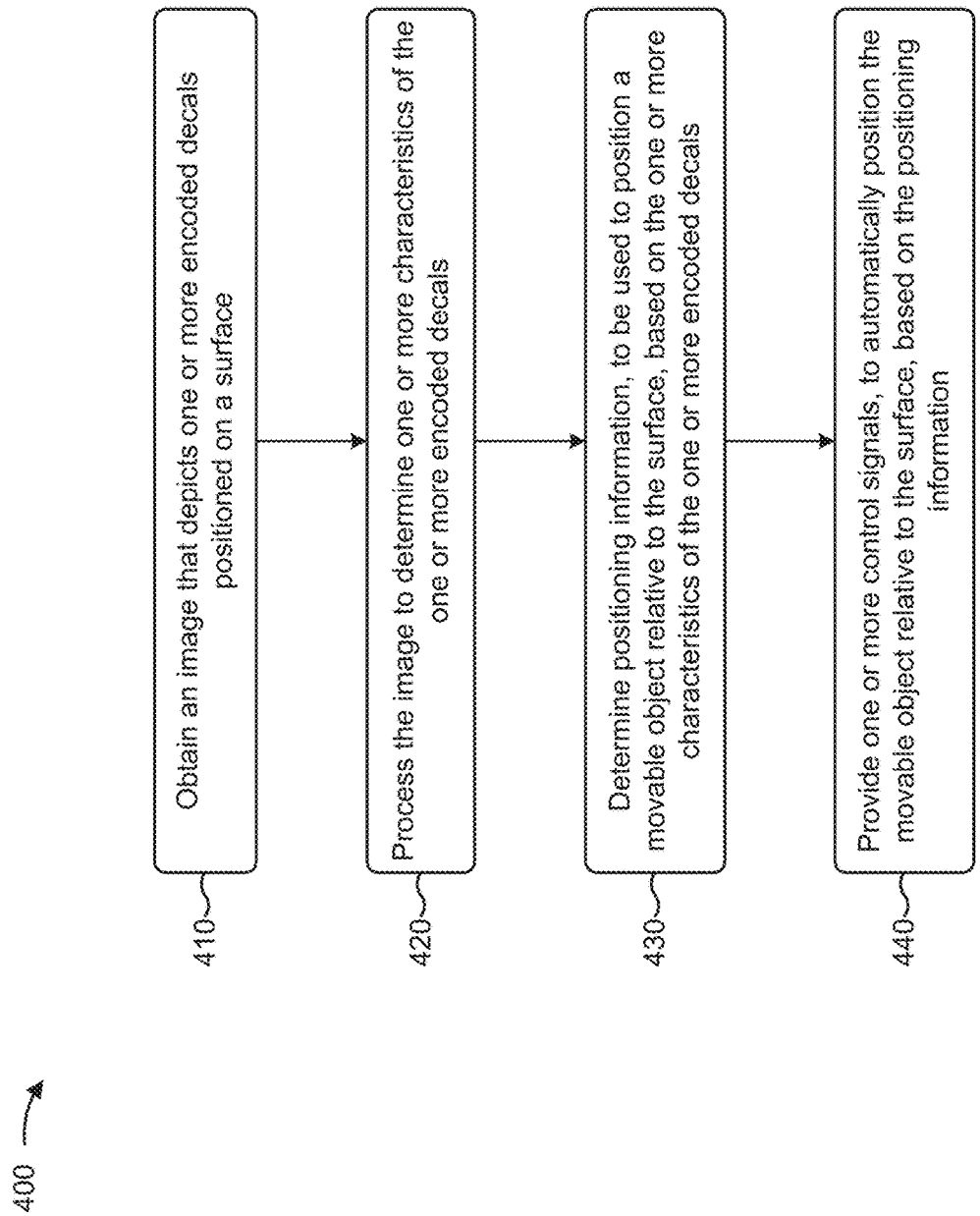
FIG. 4 is a flow chart of an example process for automated positioning using encoded decals.

FIG. 4 is a flow chart of an example process 400 for automated positioning using encoded decals. In some implementations, one or more process blocks of FIG. 4 may be performed by processing device 250. In some implementations, one or more process blocks of FIG. 4 may be performed by another device or a group of devices separate from or including processing device 250, such as camera 240 and/or actuator 260.

As shown in FIG. 4, process 400 may include obtaining an image that depicts one or more encoded decals positioned on a surface (block 410). For example, processing device 250 may obtain, from camera 240, an image that depicts one or more encoded decals positioned on a surface. In some implementations, the surface may be a body of a vehicle, and the encoded decals may be affixed to the body of the vehicle.

In some implementations, the encoded decals may be positioned or affixed to the surface relative to a target area of the surface. For example, the encoded decals may be positioned on the target area, above the target area, below the target area, to the left of the target area, to the right of the target area, at multiple locations near or around the target area (e.g., on each side of the target area, in the corners of the target area, etc.), or the like. In some implementations, the target area may include a door, an opening, a location where passengers or cargo enter or exit a vehicle, a location where material is to be deposited or removed, or the like. In some implementations, the target area may be a target for automatically moving a movable object (e.g., loading bridge 210) relative to the surface, as described below.

Any number of encoded decals may be positioned on the surface and/or depicted in the image. For example, the encoded decals may include a single encoded decal (e.g., positioned in the center of the target area). As another example, the encoded decals may include two encoded decals (e.g., positioned on opposite sides of the target area). As other examples, the encoded decals may include three encoded decals, four encoded decals (e.g., positioned on all sides of the target area, positioned at the corners of the target area, etc.), or more encoded decals. As a particular example, FIGS. 5A and 5B each show four encoded decals positioned at the corners of a door on an aircraft.

In some implementations, processing device 250 may periodically receive still images and/or may receive a video stream of a sequence of images (e.g., from camera 240). In this case, processing device 250 may process an image to determine whether encoded decals are depicted in the image. If encoded decals are not depicted, processing device 250 may discard the image to conserve processing resources and memory resources. If encoded decals are depicted, processing device 250 may process the image to determine positioning information, as described below. In the event that no encoded decals are depicted, processing device 250 may command the camera (or cameras) 240 to search a larger area to discover encoded decals (e.g., by zooming out).

In some implementations, one or more of the encoded decals may indicate an encoded area, on the surface, where the encoded decals are located. For example, an encoded decal may indicate a margin or border of an encoded area. As a particular example, as shown in FIGS. 6A-6D, an encoded area may be bounded by a shape pattern indicating a left margin and a shape pattern indicating a right margin. In this case, processing device 250 may interpret the information between the left margin and the right margin as including one or more patterns or shapes to represent particular types of information based on their position within the encoded area. For example, based on identifying the left and right margin, processing device 250 may identify a lower central portion, of an area between the left and right margin, as indicating registration information, as shown in FIGS. 6A-6D.

Figure 5A:
FIGS. 5A and 5B are diagrams of an example implementation relating to the example process shown in FIG. 4.
Figure 5B:
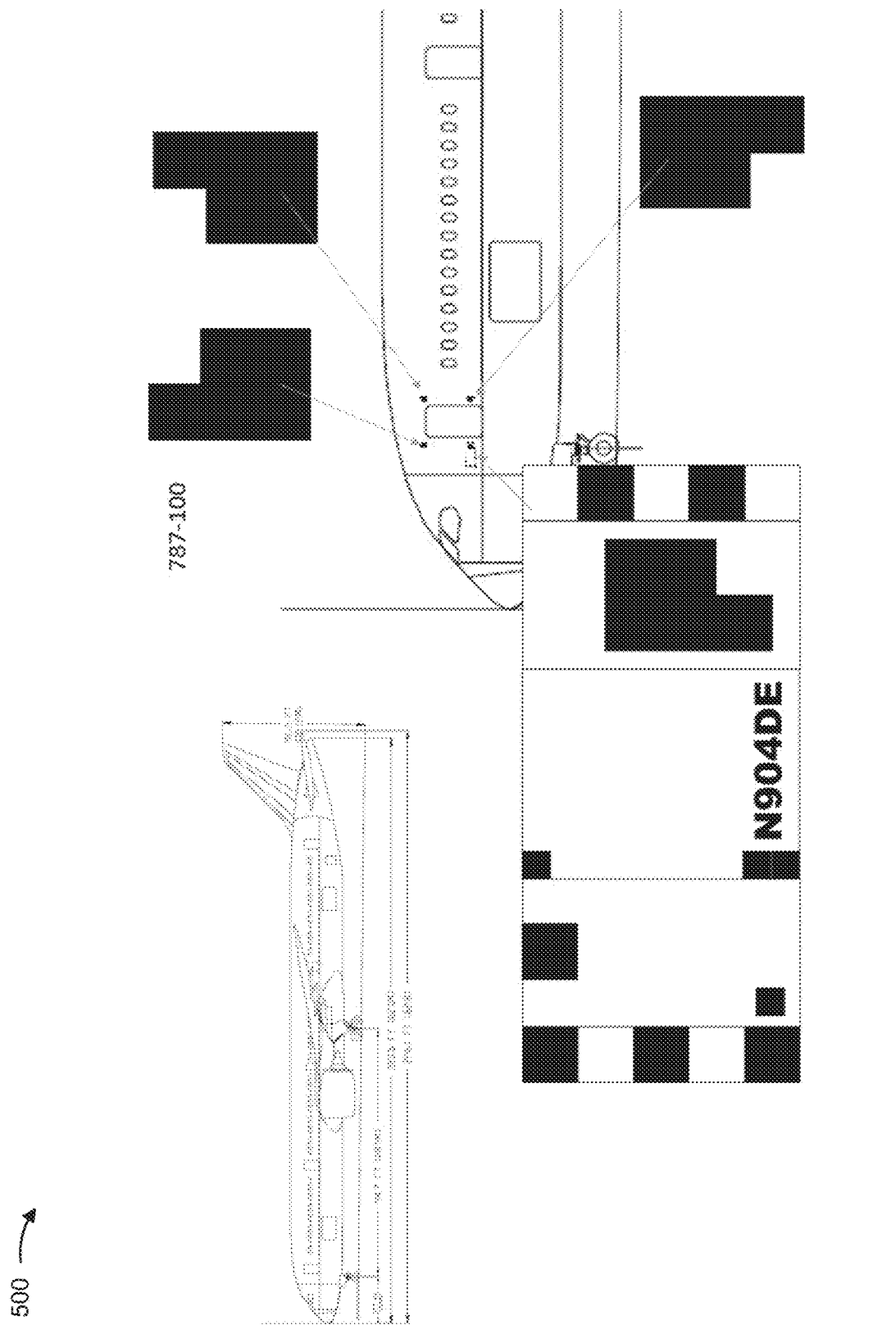

Additionally, or alternatively, an encoded decal may indicate a decal location (e.g., a position of an encoded decal relative to other encoded decals), or the like. For example, the encoded decal at each door corner may include a different shape that is unique to the corner in which the encoded decal is located. As a particular example, as shown in FIGS. 5A-5B, the shape may include a larger block and a smaller block, with the location of the smaller block relative to the larger block (e.g., above left, above right, below left, below right) indicating the location of the encoded decal relative to the door. In some implementations, processing device 250 may use the decal location information to determine whether to further process the image (e.g., to determine whether all encoded decals are depicted, or have been depicted).

As further shown in FIG. 4, process 400 may include processing the image to determine one or more characteristics of the one or more encoded decals (block 420). For example, processing device 250 may analyze the image to determine one or more characteristic(s) of the encoded decal(s) depicted in the image. A characteristic of the encoded decals may include a shape, an orientation, a color of an encoded decal, or the like. As another example, a characteristic of the encoded decals may include a size of an encoded decal (e.g., relative to sizes of one or more other encoded decals). As yet another example, a characteristic of the encoded decals may include a position of an encoded decal relative to one or more other encoded decals, or relative to one or more surface features of the surface. As still another example, a characteristic of the encoded decals may include a quantity of the encoded decals. As another example, a characteristic of the encoded decals may include a pattern formed by multiple encoded decals (e.g., based on position, shape, orientation, color, size, etc.). As another example, an encoded decal may include human readable characters or other symbols which can be decoded by processing device 250.

Although characteristics are described with reference to particular attributes above, in some implementations, processing device 250 may analyze the image to determine characteristics corresponding to other attributes of the encoded decals, and/or may determine characteristics corresponding to any number and combination of attributes. Additionally, or alternatively, processing device 250 may analyze the image to determine one or more characteristics of the surface. For example, processing device 250 may determine an outline of a door based on different colors, contrast, shadows, or the like.

As shown in FIG. 4, process 400 may include determining positioning information, to be used to position a movable object relative to the surface, based on the one or more characteristics of the one or more encoded decals (block 430). For example, processing device 250 may determine positioning information based on the one or more characteristics of the one or more encoded decals depicted in an image. In some implementations, positioning information may be used by processing device 250 to determine one or more control signals to be provided to one or more actuators 260 to control a position of a movable object (e.g., loading bridge 210) relative to a surface (e.g., a body of an airplane or another vehicle). For example, positioning information may indicate which actuators 260 are to be provided with control signals, a strength of a control signal, a sequence in which control signals are to be provided (e.g., a sequence for a single actuator 260, or a sequence for multiple actuators 260), a duration of time during which a control signal is to be provided, a type of control signal (e.g., to cause the movable object to be extended, retracted, raised, lowered, pivoted in a particular direction, etc.), or the like.

In some implementations, processing device 250 may determine positioning information based on decal information that is obtained based on processing one or more images. For example, processing device 250 may store decal information in a data structure, and may use the decal information to determine the positioning information (e.g., based on a correspondence in the data structure). The decal information may include information regarding an encoded decal, a surface, and/or a vehicle. For example, the decal information may include information regarding a vehicle to which the encoded decals are affixed.

In some implementations, the decal information may indicate a size or dimensions of the target area (e.g., a size of a door, or dimensions of a door), a size of one or more encoded decals, a curvature of the surface (e.g., a curvature of an airplane body), a manufacturer and/or model of the vehicle, a location of the target area on the vehicle (e.g., a forward door on an aircraft, a rear door of an aircraft, a cargo door of an aircraft, etc.), a location of an encoded decal relative to the target area and/or relative to other encoded decals, vehicle identification information associated with a particular vehicle (e.g., a vehicle identifier, such as a vehicle registration number, a vehicle serial number, a vehicle identification number, etc.), or the like.

Figure 6A:
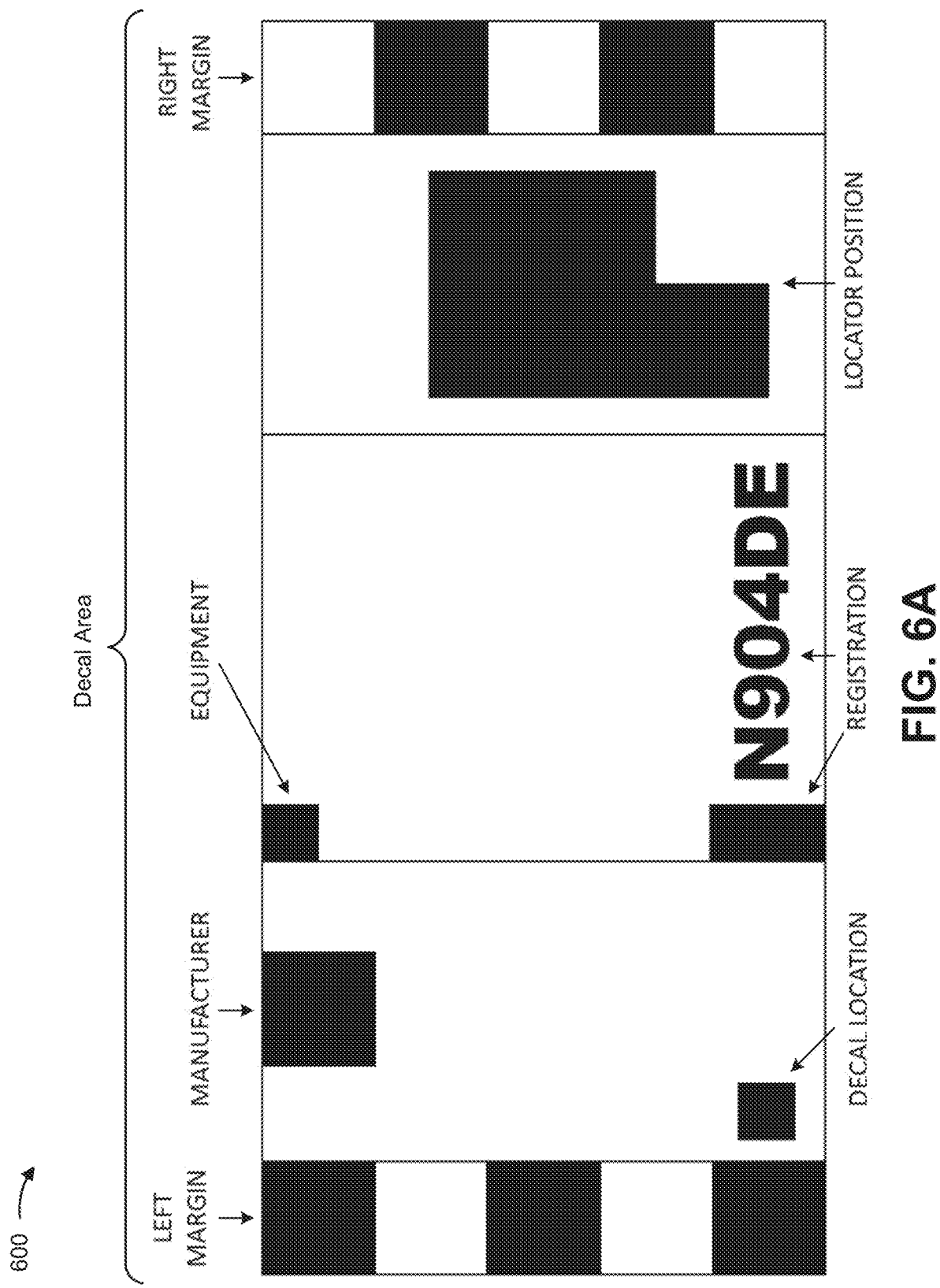
FIGS. 6A-6D are diagrams of another example implementation relating to the example process shown in FIG. 4.
Figure 6B:
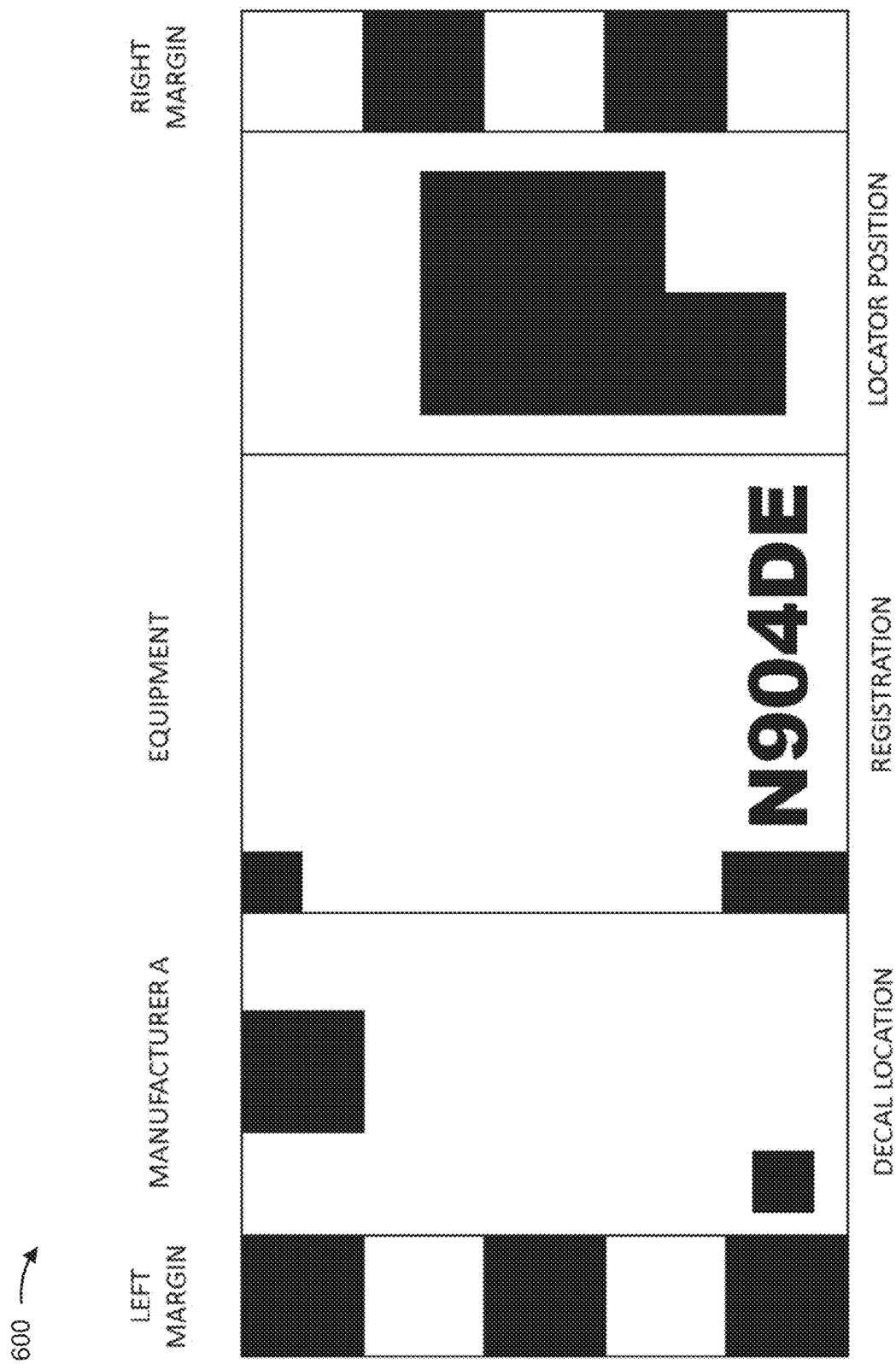
Figure 6C:
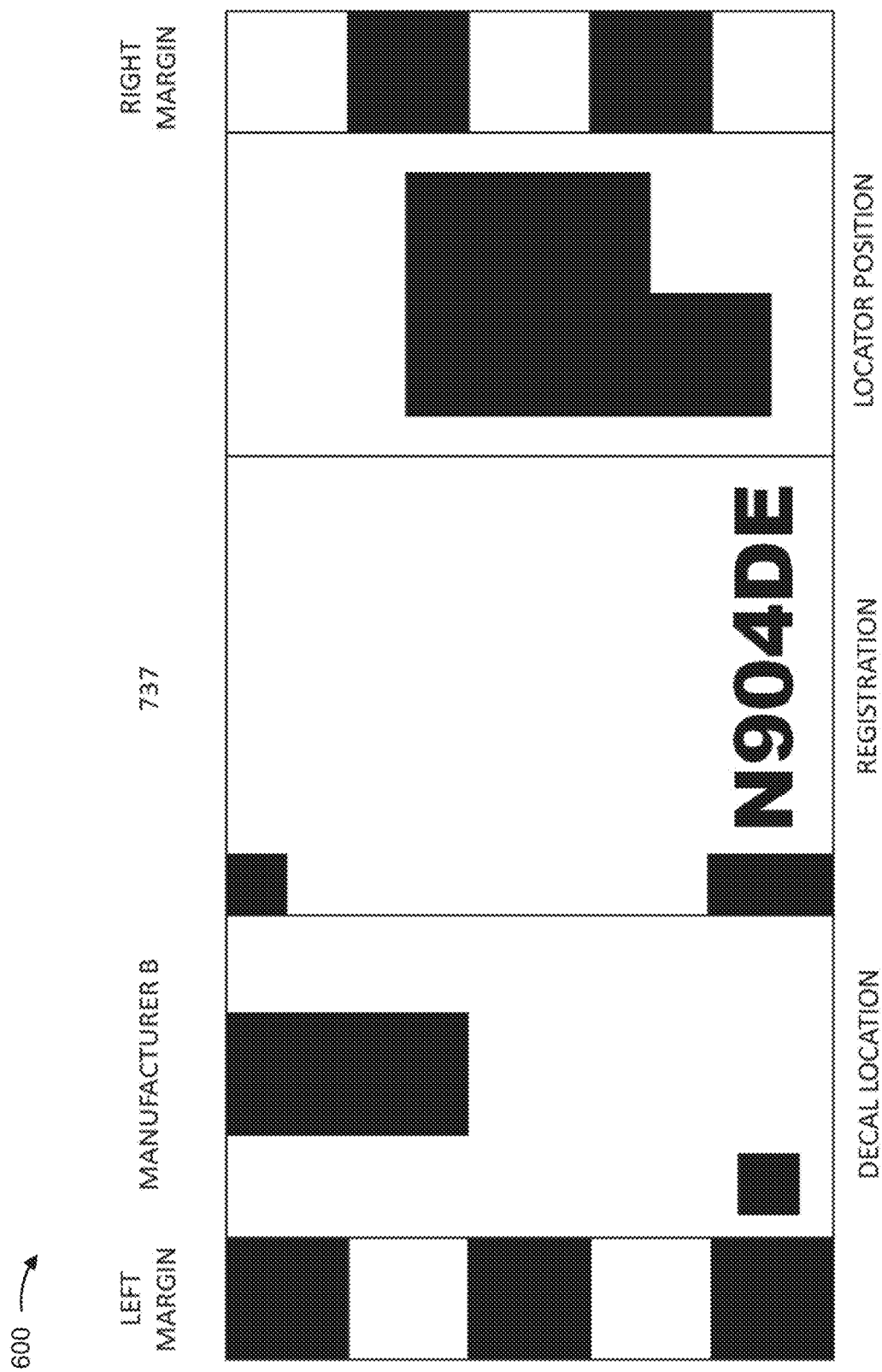
Figure 6D:
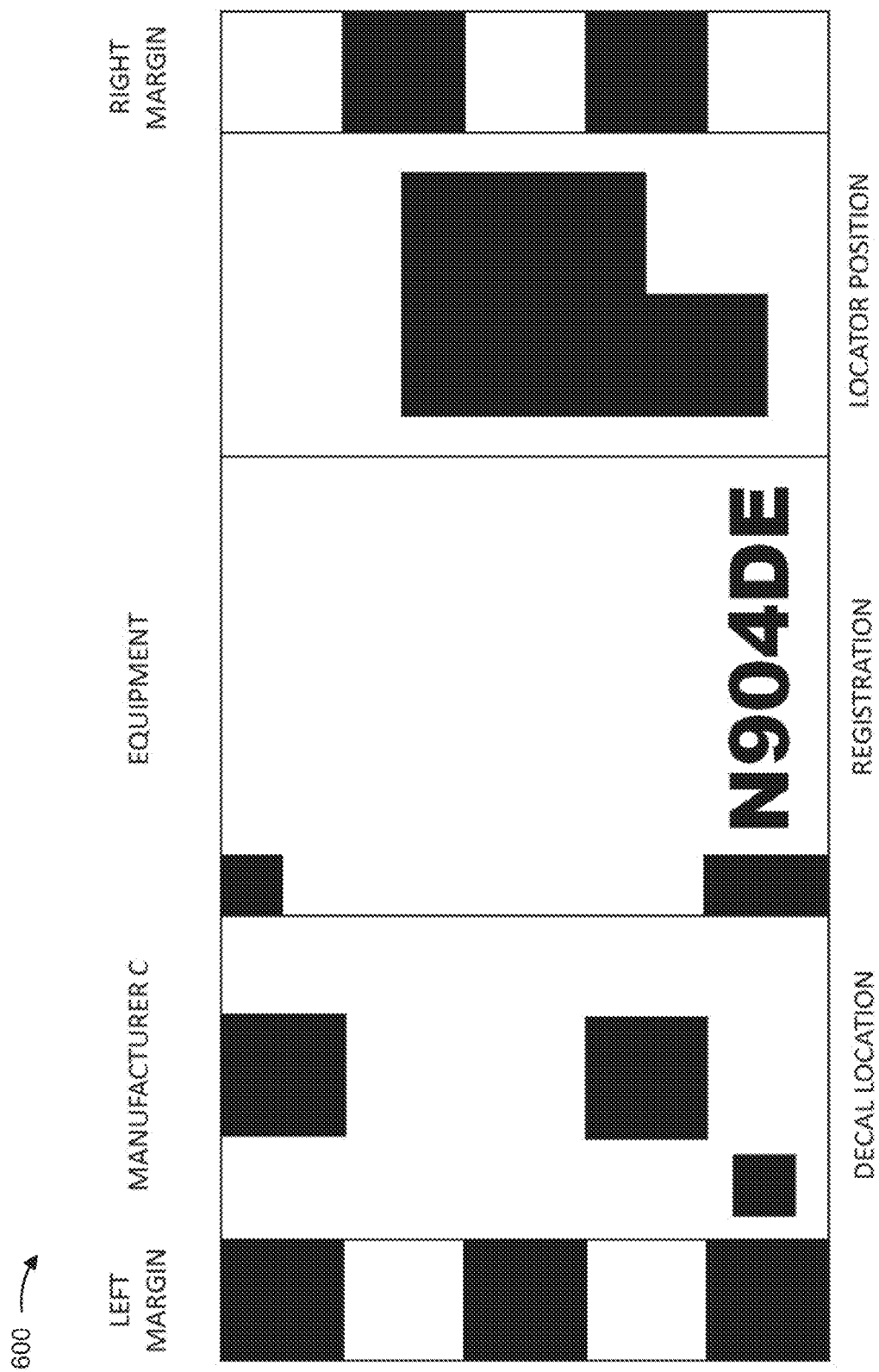

As an example, FIGS. 6A-6D show examples of encoded decals that may correspond to decal information, such as the decal information described above. In FIG. 6A, one or more encoded decals, located within the encoded area (e.g., bounded by the left margin and the right margin), may indicate a manufacturer, a type of equipment (e.g., a type of vehicle, a vehicle model, etc.), a location of the encoded decal relative to a target area (e.g., shown as "Decal Location"), registration information associated with the vehicle, and/or a location of the target area on the vehicle (e.g., shown as "Locator Position"). FIGS. 6B-6D show additional examples of using different sizes, shapes, and/or positions of encoded decals to indicate different manufacturers.

In some implementations, processing device 250 may store one or more data structures that associate encoded decal characteristics and decal information, and that associate decal information and positioning information. In this way, processing device 250 may enhance a user experience by making updates to the data structures more user-friendly via input of decal information. In some implementations, processing device 250 may store a data structure that directly associates encoded decal characteristics and positioning information. This may reduce processing time and conserve processing resources by eliminating data structure operations associated with using decal information.

As further shown in FIG. 4, process 400 may include providing one or more control signals, to automatically position the movable object relative to the surface, based on the positioning information (block 440). For example, processing device 250 may provide one or more control signals to one or more actuators 260 in a manner specified by the positioning information. As a particular example, processing device 250 may provide control signals to particular actuators 260, and/or may provide the control signals in a particular sequence, with a particular signal strength, for a particular duration of time, or the like. In this case, actuator 260 may move loading bridge 210 based on the control signals to automatically position loading bridge 210 relative to a body of a vehicle During positioning of the movable object, processing device 250 may obtain additional images (e.g., still images or video) from camera 240, may analyze the additional images, and may provide further control signals based on analyzing the images. For example, processing device 250 may determine a distance of loading bridge 210 from a target area based on a known size of an encoded decal and a size of the encoded decal observed in an image. In this case, processing device 250 may provide the control signal based on the determined distance, which may be different for different types of vehicles (e.g., the aircraft shown in FIGS. 5A and 5B). As another example, processing device 250 may determine a position relative to a target area based on a known pattern of encoded decals and a pattern of encoded decals observed in an image. In this case, processing device 250 may provide a control signal based on the determined position.

In some implementations, prior to providing control signals for automatic positioning, processing device 250 may perform a verification of the vehicle. For example, processing device 250 may compare vehicle registration information and other decal information to confirm accuracy of decal information. If there is a mismatch, or if verification otherwise fails (e.g., vehicle registration information indicates a first type of vehicle, and encoded decal characteristics indicate a second type of vehicle), then processing device 250 may prevent automatic positioning from being performed. In this case, processing device 250 may prevent control signals from being provided to actuators 260, and/or may provide an alert (e.g., via an output device, such as a display or a speaker) indicating that manual positioning of loading bridge 210 is required.

In some implementations, processing device 250 may perform verification using a database of vehicle information. In this case, processing device 250 may verify whether an identified vehicle (e.g., identified using encoded decals) is a correct vehicle for a gate, a dock, or the like. For example, the database may indicate vehicle types permitted to be connected to a particular loading bridge.

In some implementations, processing device 250 may determine whether positioning of the movable object relative to the surface is complete. For example, processing device 250 may determine whether positioning of the movable object is complete based on a distance, a position, a size of one or more encoded decals, one or more sensor readings, or the like. In some implementations, processing device 250 may output a control signal to perform an action based on determining that positioning of the movable object is complete. For example, processing device 250 may output a control signal to open a door, to start a conveyor, to provide a notification, or the like. Additionally, or alternatively, processing device 250 may output a signal (e.g., an audible signal, a visible signal, etc.) to notify a user (e.g., an operator) that positioning of the movable object is complete.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a loading bridge with a camera and a processing device that automatically aligns the loading bridge with a door of a vehicle based on one or more images captured by the camera. In this way, the possibility and/or frequency of alignment errors is reduced, thereby reducing the risk of damage to the loading bridge or to the vehicle, and/or reducing delays associated with loading or unloading the vehicle.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
   determine, based on processing an image that depicts one or more encoded decals positioned on a vehicle, characteristics of the one or more encoded decals,
      the characteristics of the one or more encoded decals including:
         a shape of the one or more encoded decals,
         a position of the one or more encoded decals, and
         one or more characters or symbols of the one or more encoded decals;
   obtain, from a data structure, decal information associated with the characteristics of the one or more encoded decals,
      the decal information including information regarding at least one of:
         a size of a door of the vehicle,
         dimensions of the door,
         a location of the door,
         a manufacturer of the vehicle,
         a model of the vehicle, or
         identification information of the vehicle;
   determine positioning information, associated with the decal information, for positioning an object relative to the vehicle; and
   provide, based on the positioning information, control information.

2. The device of claim 1, where the one or more processors are further to:
   process the image to determine the one or more encoded decals.

3. The device of claim 1, where the one or more encoded decals are affixed to a surface of the vehicle.

4. The device of claim 1, where the one or more processors are further to:
   determine that another image does not depict any encoded decals; and
   provide a command for a camera to search a larger area to discover an encoded decal.

5. The device of claim 1, where the characteristics of the one or more encoded decals further include information indicating a margin or border of an encoded area.

6. The device of claim 1, where the positioning information indicates which actuators of the object are to be provided with control signals.

7. The device of claim 1, where the image is included in a video stream of a sequence of images; and
   where the one or more processors are further to:
      process the video stream to determine the one or more encoded decals.

8. A method, comprising:
determining, by a device and based on processing an image that depicts one or more encoded decals positioned on a vehicle, characteristics of the one or more encoded decals the characteristics of the one or more encoded decals including:
a shape of the one or more encoded decals,
a position of the one or more encoded decals, and
one or more characters or symbols of the one or more encoded decals;
obtaining, by the device and from a data structure, decal information associated with the characteristics of the one or more encoded decals,
   the decal information including information regarding at least one of:
      a size of a door of the vehicle,
      dimensions of the door,
      a location of the door,
      a manufacturer of the vehicle,
      a model of the vehicle, or
      identification information of the vehicle;
determining, by the device, positioning information, associated with the decal information, for positioning an object relative to the vehicle; and
providing, by the device and based on the positioning information, control information.

9. The method of claim 8, where the positioning information includes information regarding a sequence in which control signals are to be provided.

10. The method of claim 8,
where the decal information indicates at least one of:
   a size of a target area;
   dimensions of the target area;
   a location of the target area; or
   a location of the one or more encoded decals relative to the target area.

11. The method of claim 10, further comprising:
storing one or more data structures that associate the decal information and the positioning information.

12. The method of claim 8, where the control information includes one or more controls for one or more actuators.

13. The method of claim 8, where the object is a loading bridge; and
where providing the control information comprises:
   providing one or more control signals to position the loading bridge relative to the vehicle.

14. The method of claim 8, where providing the control information comprises:
providing one or more control signals in a particular sequence.

15. A non-transitory computer-readable medium storing instructions, the instructions comprising:
one or more instructions that, when executed by one or more processors, further cause the one or more processors to:
   determine, based on processing an image that depicts one or more encoded decals positioned on a vehicle, characteristics of the one or more encoded decals the characteristics of the one or more encoded decals including:
      a shape of the one or more encoded decals,
      a position of the one or more encoded decals, and
      one or more characters or symbols of the one or more encoded decals;
   obtain, from a data structure, decal information associated with the characteristics of the one or more encoded decals;
   obtain, from the data structure, positioning information associated with the decal information for positioning an object relative to the vehicle; and
   provide, based on the positioning information, control information.

16. The non-transitory computer-readable medium of claim 15, where the one or more instructions, when executed by the one or more processors, further cause the one or more processors to:
   obtain another image;
   analyze the other image; and
   provide further control information based on analyzing the other image.

17. The non-transitory computer-readable medium of claim 15, where the one or more instructions, when executed by the one or more processors, further cause the one or more processors to:
  determine a distance of the object from a target area based on the characteristics; and
  where the one or more instructions, that cause the one or more processors to provide the control information, cause the one or more processors to:
    provide one or more controls signals based on determining the distance.

18. The non-transitory computer-readable medium of claim 15, where the one or more instructions, when executed by the one or more processors, further cause the one or more processors to:
  perform a verification of the vehicle; and
  where the one or more instructions, that cause the one or more processors to provide the control information, cause the one or more processors to:
    provide the control information based on performing the verification of the vehicle.

19. The non-transitory computer-readable medium of claim 15, where the one or more instructions, when executed by the one or more processors, further cause the one or more processors to:
  determine whether positioning of the object is complete; and
  output a control signal to perform an action based on determining that positioning of the object is complete.

20. The non-transitory computer-readable medium of claim 19, where the control signal to perform the action includes at least one of:
  a control signal to open a door,
  a control signal to start a conveyor, or
  a control signal to provide a notification.

* * * * *